US011539435B2

(12) United States Patent
Singh et al.

(10) Patent No.: US 11,539,435 B2
(45) Date of Patent: Dec. 27, 2022

(54) SINGLE CHANNEL LIGHT COMMUNICATION FOR VEHICLE REGISTRATION

(71) Applicant: Ford Global Technologies, LLC, Dearborn, MI (US)

(72) Inventors: Aditya Singh, Dearborn, MI (US); Weifeng Xiong, Dearborn, MI (US); James Carthew, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 321 days.

(21) Appl. No.: 16/765,288

(22) PCT Filed: Nov. 29, 2017

(86) PCT No.: PCT/US2017/063776
§ 371 (c)(1),
(2) Date: May 19, 2020

(87) PCT Pub. No.: WO2019/108181
PCT Pub. Date: Jun. 6, 2019

(65) Prior Publication Data
US 2020/0313769 A1 Oct. 1, 2020

(51) Int. Cl.
*H04B 10/112* (2013.01)
*B64C 39/02* (2006.01)
(Continued)

(52) U.S. Cl.
CPC ........ *H04B 10/1121* (2013.01); *B64C 39/024* (2013.01); *G06N 3/0454* (2013.01);
(Continued)

(58) Field of Classification Search
CPC .. H04B 10/1121; H04B 10/116; G06V 20/46; B64C 39/024; B64C 2201/146; G06N 3/0454; G08G 5/0069
(Continued)

(56) References Cited

U.S. PATENT DOCUMENTS 9,741,255 B1 * 8/2017 Navot ................. G08G 5/0078
2013/0138388 A1 5/2013 Jain et al.
(Continued)

OTHER PUBLICATIONS

International Search Report of the International Searching Authority for PCT/US2017/063776 dated Mar. 13, 2018.

*Primary Examiner* — Anner N Holder
*Assistant Examiner* — Matthew David Kim
(74) *Attorney, Agent, or Firm* — Brandon Hicks; Eversheds Sutherland (US) LLP

(57) ABSTRACT

Techniques and examples pertaining to single channel line-of-sight (LOS) communication are described. The transmitting end of the LOS communication involves direct modulation of a light emitted from a light emitter. The receiving end of the LOS communication involves receiving a video stream of the light emitter emitting the light, wherein the video stream comprises a plurality of video frames that are continuous in time. The receiving end of the LOS communication also involves converting the video stream to a binary string comprising a plurality of binary bits. Each of the binary bits corresponds to a respective one of the plurality of video frames, and the binary string contains a repeated binary pattern representing a message being conveyed. The receiving end of the LOS communication also involves extracting the binary pattern from the binary string and then decoding the binary pattern to obtain the message.

9 Claims, 9 Drawing Sheets

(51) Int. Cl.
   *G06N 3/04*     (2006.01)
   *G08G 5/00*     (2006.01)
   *H04B 10/116*   (2013.01)
   *G06V 20/40*    (2022.01)

(52) U.S. Cl.
   CPC ........... *G06V 20/46* (2022.01); *G08G 5/0069* (2013.01); *H04B 10/116* (2013.01); *B64C 2201/146* (2013.01)

(58) Field of Classification Search
   USPC .............................................................. 701/3
   See application file for complete search history.

(56) References Cited

U.S. PATENT DOCUMENTS

| | | | |
|---|---|---|---|
| 2014/0369558 A1 | 12/2014 | Holz | |
| 2015/0104184 A1* | 4/2015 | Jeffrey | H04L 9/3271 |
| | | | 398/130 |
| 2016/0072584 A1* | 3/2016 | Ganick | H04B 10/116 |
| | | | 398/118 |
| 2016/0139977 A1* | 5/2016 | Ashani | G06N 3/08 |
| | | | 714/26 |
| 2016/0203297 A1 | 7/2016 | Lynch et al. | |
| 2016/0344476 A1 | 11/2016 | Pederson et al. | |
| 2021/0283513 A1* | 9/2021 | Wildhaber | A63F 13/216 |

* cited by examiner

Decimal - Binary - Octal - Hex – ASCII Conversion Chart

| Decimal | Binary | Octal | Hex | ASCII | Decimal | Binary | Octal | Hex | ASCII |
|---|---|---|---|---|---|---|---|---|---|
| 32 | 00100000 | 040 | 20 | SP | 64 | 01000000 | 100 | 40 | @ |
| 33 | 00100001 | 041 | 21 | ! | 65 | 01000001 | 101 | 41 | A |
| 34 | 00100010 | 042 | 22 | " | 66 | 01000010 | 102 | 42 | B |
| 35 | 00100011 | 043 | 23 | # | 67 | 01000011 | 103 | 43 | C |
| 36 | 00100100 | 044 | 24 | $ | 68 | 01000100 | 104 | 44 | D |
| 37 | 00100101 | 045 | 25 | % | 69 | 01000101 | 105 | 45 | E |
| 38 | 00100110 | 046 | 26 | & | 70 | 01000110 | 106 | 46 | F |
| 39 | 00100111 | 047 | 27 | ' | 71 | 01000111 | 107 | 47 | G |
| 40 | 00101000 | 050 | 28 | ( | 72 | 01001000 | 110 | 48 | H |
| 41 | 00101001 | 051 | 29 | ) | 73 | 01001001 | 111 | 49 | I |
| 42 | 00101010 | 052 | 2A | * | 74 | 01001010 | 112 | 4A | J |
| 43 | 00101011 | 053 | 2B | + | 75 | 01001011 | 113 | 4B | K |
| 44 | 00101100 | 054 | 2C | , | 76 | 01001100 | 114 | 4C | L |
| 45 | 00101101 | 055 | 2D | - | 77 | 01001101 | 115 | 4D | M |
| 46 | 00101110 | 056 | 2E | . | 78 | 01001110 | 116 | 4E | N |
| 47 | 00101111 | 057 | 2F | / | 79 | 01001111 | 117 | 4F | O |
| 48 | 00110000 | 060 | 30 | 0 | 80 | 01010000 | 120 | 50 | P |
| 49 | 00110001 | 061 | 31 | 1 | 81 | 01010001 | 121 | 51 | Q |
| 50 | 00110010 | 062 | 32 | 2 | 82 | 01010010 | 122 | 52 | R |
| 51 | 00110011 | 063 | 33 | 3 | 83 | 01010011 | 123 | 53 | S |
| 52 | 00110100 | 064 | 34 | 4 | 84 | 01010100 | 124 | 54 | T |
| 53 | 00110101 | 065 | 35 | 5 | 85 | 01010101 | 125 | 55 | U |
| 54 | 00110110 | 066 | 36 | 6 | 86 | 01010110 | 126 | 56 | V |
| 55 | 00110111 | 067 | 37 | 7 | 87 | 01010111 | 127 | 57 | W |
| 56 | 00111000 | 070 | 38 | 8 | 88 | 01011000 | 130 | 58 | X |
| 57 | 00111001 | 071 | 39 | 9 | 89 | 01011001 | 131 | 59 | Y |
| 58 | 00111010 | 072 | 3A | : | 90 | 01011010 | 132 | 5A | Z |

FIG. 2

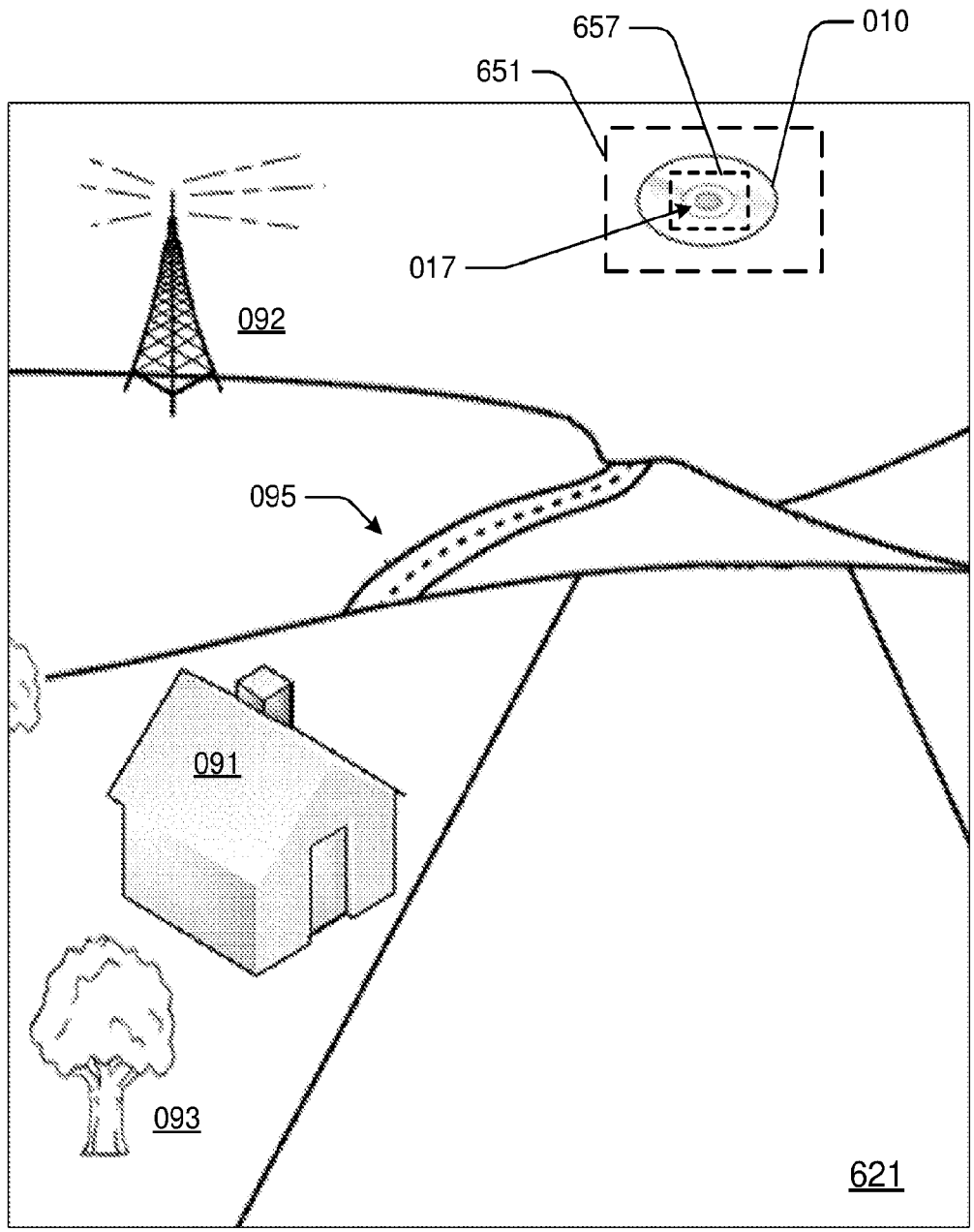
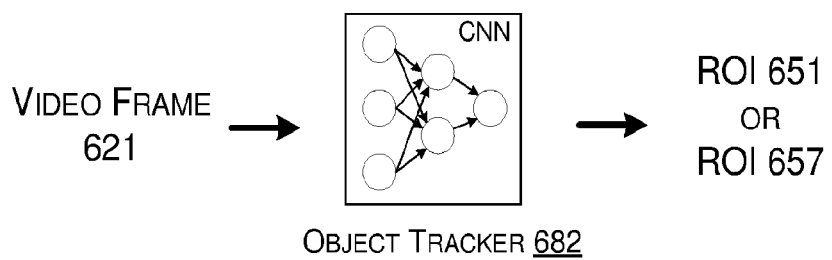
FIG. 6

800

```
┌─────────────────────────────────────────────────────────────┐
│  TRANSFORM BINARY STRING FROM TIME DOMAIN TO FREQUENCY DOMAIN │
│                            810                                │
└─────────────────────────────────────────────────────────────┘
                              │
                              ▼
┌─────────────────────────────────────────────────────────────┐
│       LOCATE PEAK LOCATIONS IN BINARY STRING (F-DOMAIN)      │
│                            820                                │
└─────────────────────────────────────────────────────────────┘
                              │
                              ▼
┌─────────────────────────────────────────────────────────────┐
│ DETERMINE BINARY PATTERN                              830     │
│ (F-DOMAIN)                                                    │
│   ┌───────────────────────────────────────────────────┐       │
│   │      DIVIDE BINARY STRING INTO SEGMENTS (F-DOMAIN) │       │
│   │                       832                          │       │
│   └───────────────────────────────────────────────────┘       │
│                           │                                    │
│                           ▼                                    │
│   ┌───────────────────────────────────────────────────┐       │
│   │          DETERMINE ONE SEGMENT AS                  │       │
│   │          BINARY PATTERN (F-DOMAIN)                 │       │
│   │                       834                          │       │
│   └───────────────────────────────────────────────────┘       │
└─────────────────────────────────────────────────────────────┘
                              │
                              ▼
┌─────────────────────────────────────────────────────────────┐
│       GENERATE SELF-CONCATENATED BINARY PATTERN (F-DOMAIN)    │
│                            840                                │
└─────────────────────────────────────────────────────────────┘
                              │
                              ▼
┌─────────────────────────────────────────────────────────────┐
│       TRANSFORM SELF-CONCATENATED BINARY PATTERN TO T-DOMAIN  │
│                            850                                │
└─────────────────────────────────────────────────────────────┘
                              │
                              ▼
┌─────────────────────────────────────────────────────────────┐
│       REMOVE REDUNDANCY DUE TO CAMERA OVERSAMPLING (T-DOMAIN) │
│                            860                                │
└─────────────────────────────────────────────────────────────┘
                              │
                              ▼
┌─────────────────────────────────────────────────────────────┐
│       LOCATE MASSAGE IDENTIFIER AND DETERMINE BINARY PATTERN  │
│                            870                                │
└─────────────────────────────────────────────────────────────┘
```

FIG. 8

SINGLE CHANNEL LIGHT COMMUNICATION FOR VEHICLE REGISTRATION

TECHNICAL FIELD

The present disclosure generally relates to wireless data communication and, more particularly, to single channel light modulation for non-networked line-of-sight (LOS) communication as applied to manned and unmanned transportation vehicles.

BACKGROUND

Regulation of unmanned aerial vehicles (UAVs) is dependent upon the registration of UAVs such that an operator of a UAV can be identified at any time. For example, without some form of on-vehicle registration, a UAV operator may break Federal Aviation Authority (FAA) regulations and avoid punishment by simply abandoning the UAV. Enforcement of UAV laws is impossible in the absence of a system that associates or relates a vehicle to its owner/operator.

Current methods for identifying registration of a UAV have various limitations. For example, a registration label affixed to a UAV (similar to a license plate or a vehicle identification number affixed to or engraved on a car) may assist in identifying the UAV upon recovering the UAV or with a possession of the UAV, but may be difficult to read from a distance when the UAV is airborne. Alternatively, cellular- or radio-networked solutions may be employed. For example, an airborne UAV may send identification signals to nearby base stations or radio transponders of a cellular or mobile phone/data network for the identification of the UAV itself, but this would not be feasible when the UAV flies through pockets of radio- or cellular-darkness, such as remote areas where a mobile phone service coverage does not reach. In addition, radio-based UAV registration may be subject to spoofing, being used as a vector of malware, or causing a mistaken identify in an event that multiple UAVs are flying in a same area.

An important consideration in UAV registration resides in an ability for a person, a vehicle or an apparatus to quickly identify a UAV when the UAV is in sight of the person, the vehicle or the apparatus, even in an area that lacks mobile network service. A specific example would be identifying unauthorized UAVs flying in U.S. National Parks, most part of which typically lacking network services.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 2 is a diagram showing a coding/decoding table which embodiments in accordance with the present disclosure may utilize.

FIG. 6 is a diagram showing details of a part of the example process of FIG. 5 in accordance with an embodiment of the present disclosure.

FIG. 8 is a flowchart depicting an example process of another part of the example process of FIG. 4 in accordance with an embodiment of the present disclosure.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Although examples of the present disclosure are mostly provided in the context of UAV, the scope of the present disclosure is not limited thereto. That is, various implementations, concepts, schemes, systems, methods and apparatuses described herein may be applicable to other types of transportation vehicles, surveillance vehicles or service vehicles including automobiles, drones, airborne vessels, and/or waterborne vessels, either manned or unmanned, and either man-operated or autonomous. Moreover, the scope of the present disclosure extends beyond communications between vehicles and may include communications between a vehicle and a non-vehicle object, such as a person, a machine, an infrastructure, or a building.

The present disclosure is related to a communication method that enables a UAV to convey registration information of the UAV to a receiving party in a non-networked environment. The present disclosure proposes a light communication system used with the UAV to generate and transmit a message, which may include the registration information. The light communication system of the present disclosure may constitute a single communication channel, having a transmitting end and a receiving end. On the transmitting end, the light communication system may use a light-emitting device, such as a light-emitting diode (LED), that is turned on and off by a microcontroller to encode the message through direct modulation. The message may include an identity (e.g., a FAA registration number) associated with the UAV. On the receiving end, a video recording device (e.g., a camera of a smartphone) may record or otherwise receive the modulated light signal. An algorithm implemented by software, hardware, or a combination of both (e.g., an app running on the smartphone) may analyze the received video and decode the message from the video. Based on the decoded message, the identity of the UAV (e.g., the registered owner of the UAV) may be known.

Various embodiments of the light communication system may be implemented in an example scenario depicted in FIG. 1, as described below.

Figure 1:
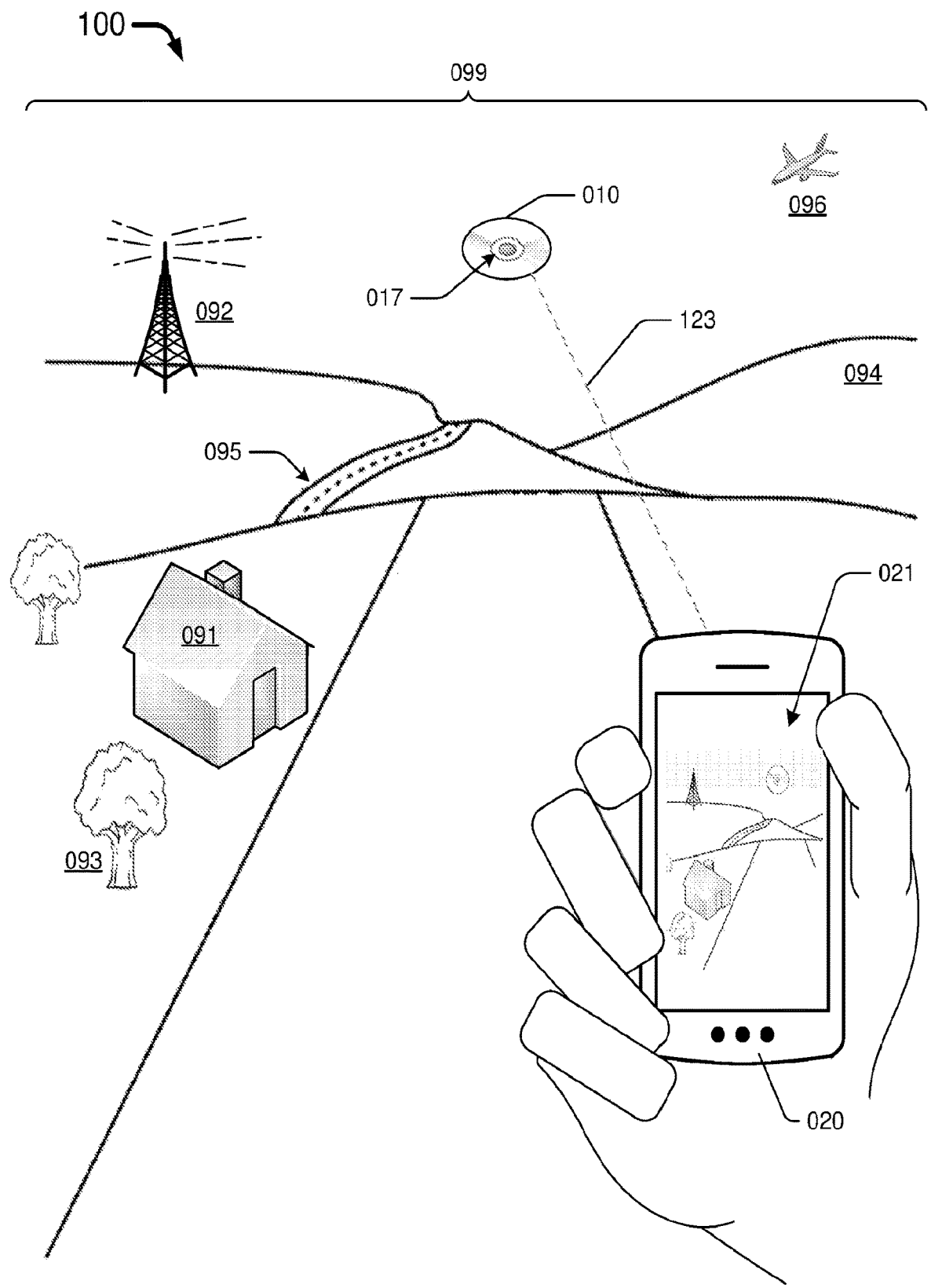
FIG. 1 is a diagram depicting an example scenario in which embodiments in accordance with the present disclosure may be utilized.

FIG. 1 depicts an example scenario 100 in which embodiments of the proposed light communication system may be implemented. Scenario 100 may include a non-networked environment 099 in which a UAV 010 may be traversing. That is, environment 099 may not have a cellular or mobile phone/data network that is available for UAV 010 to communicate via while UAV 010 traverses environment 099. UAV 010 may be equipped with a light emitter 017 that is continuously emitting a light signal that conveys a message when UAV 010 traverses environment 099. In some embodiment, light emitter 017 may also serve as a safety light (e.g., an anti-collision light) that is constantly operating when UAV 010 is airborne or in operation. Light emitter 017 may be controlled by a microcontroller (not shown) embedded in UAV 010 to emit the light signal.

A device having a video recording capability, such as a smartphone 020, may also be present in environment 099. As shown in FIG. 1, there may be an imaginary LOS 123 between smartphone 020 and UAV 010. LOS 123 may be tracking UAV 010, and thus moving accordingly within environment 099 as UAV 010 traverses or otherwise travels across environment 099. Given that a user holding smartphone 020 may also be moving within environment 099 as UAV 010 traverses environment 099, LOS 123 would be moving within environment 099 according to the movement of both UAV 010 and the user.

Specifically, smartphone 020 may be equipped with a video camera (not explicitly shown in FIG. 1) or some other video recording device that is capable of recording or otherwise generating a video stream 021, along LOS 123, of UAV 010 traversing environment 099. Video stream 021 may capture, in addition to UAV 010, other objects or background presenting in environment 099, such as a house 091, a tower 092, a tree 093, a hill 094, a road 095 and/or an airplane 096. Moreover, smartphone 020 may implement an algorithm using software or hardware embedded in smartphone 020, or a combination of both (e.g., an app running on the smartphone), to analyze video stream 021 and decode the message conveyed in the light signal, as recorded in video stream 021, that is emitted from light emitter 017 of UAV 010.

The message conveyed in the light signal emitted by light emitter 017 may represent a plurality of alphanumerical digits (i.e., letters or numbers). In some embodiments, the plurality of alphanumerical digits may be a registration number of UAV 010 as assigned by FAA. The registration number may have a fixed length, such as a length of 10 digits. In some embodiments, the registration number may begin with letter 'F' or letters 'FA'. That is, for all UAVs that are registered with FAA, FAA assigns a unique 10-digit long registration number, starting with letter 'F' or 'FA', to each UAV, respectively, as an identification of the UAV. The use of letter 'F' or letters 'FA' serves as a message identifier, and is predetermined based a communication protocol employed by the light communication system. FAA may also maintain a database indexed by the registration numbers, with each entry of the database recording relevant information (e.g., year, make, model, owner's name, owner's address) of the respective UAV. With the registration number of a particular UAV being known, the relevant information of the UAV may also be made known through the database.

The light signal emitted by light emitter 017 may convey the message (e.g., the registration number of UAV 010) as the microcontroller embedded in UAV 010 modulates the light signal according to the message. Namely, the microcontroller may encode the message into the light signal by modulating the light signal at a predetermined frequency, which is also predetermined according to the communication protocol employed by the light communication system. In some embodiments, the microcontroller may modulate the light signal according to American Standard Code for Information Interchange (ASCII) coding method. As shown in ASCII table 200 of FIG. 2, each alphanumerical digit of the message may be converted into an 8-bit long binary code (i.e., a binary representation consisting of 8 bits of 0's, 1's, or a combination of both). For example, the FAA registration number of UAV 010 of FIG. 1 may be a 10-digit number "FA12345678". Each of the 10 digits of the registration number may be converted into an 8-bit long binary representation (i.e., an ASCII code) according to ASCII table 200. That is, digit 'F' may be converted to ASCII code '01000110', digit 'A' may be converted to ASCII code '01000001', digit '1' may be converted to ASCII code '00110001', digit '2' may be converted to ASCII code '00110010', digit '3' may be converted to ASCII code '00110011', digit '4' may be converted to ASCII code '00110100', digit '5' may be converted to ASCII code '00110101', digit '6' may be converted to ASCII code '00110110', digit '7' may be converted to ASCII code '00110111', and digit '8' may be converted to ASCII code '00111000'.

Figure 3:
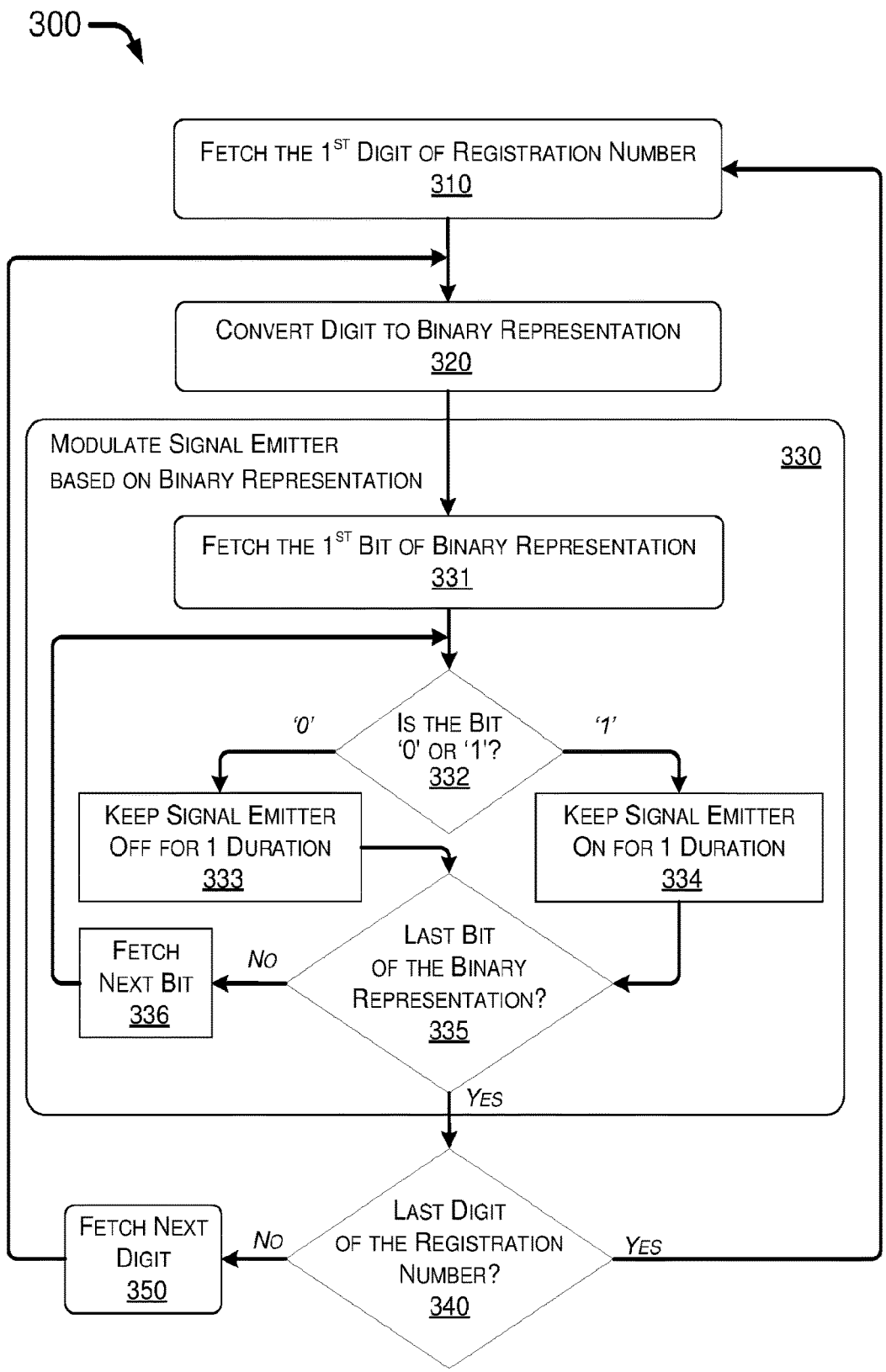
FIG. 3 is a flowchart depicting an example process of a transmitting end of a communication system in accordance with an embodiment of the present disclosure.

FIG. 3 illustrates a flowchart depicting an example process 300 employed on the transmitting end of the light communication system. In particular, process 300 shows how a processor on the transmitting end of the light communication system (e.g., a processor embedded in UAV 010 of FIG. 1) may modulate a signal emitter (e.g., light emitter 017 of FIG. 1) to convey a message (e.g., the 10-digit FAA registration number "FA12345678" of UAV 010 of FIG. 1) to a receiving party (e.g., smartphone 020 of FIG. 1). Process 300 may include one or more operations, actions, or functions shown as blocks such as 310, 320, 330, 340 and 350 of FIG. 3. Although illustrated as discrete blocks, various blocks of process 300 may be divided into additional blocks, combined into fewer blocks, or eliminated, depending on the desired implementation. Process 300 may begin at block 310.

At 310, process 300 may involve the processor embedded in UAV 010 fetching a $1^{st}$ digit of registration number "FA12345678", namely, digit "F". Process 300 may proceed from 310 to 320.

At 320, process 300 may involve the processor converting the $1^{st}$ digit, "F", to a binary representation. For example, the processor may convert digit "F" to an 8-bit ASCII code '01000110' according to ASCII table 200 of FIG. 2. Process 300 may proceed from 320 to 330. Block 330 may include sub-blocks 331, 332, 333, 334, 335 and 336. Specifically, process 300 may proceed from block 320 to sub-block 331 of block 330.

At 330, process 300 may involve the processor modulating the signal emitter according to the 8-bit ASCII code '01000110' representing the $1^{st}$ digit, "F", of the registration number of UAV 010, one bit at a time. Specifically, at sub-block 331, process 300 may involve the processor fetching a $1^{st}$ bit of ASCII code '01000110', i.e., the most significant bit (MSB), '0'. Process 300 may proceed from 331 to 332.

At 332, process 300 may involve the processor determining whether the bit previously fetched at sub-block 331 is '0' or '1'. In an event that the processor determines the bit fetched is '0', process 300 may proceed from 332 to 333, at which process 300 may involve the processor keeping the signal emitter off for 1 duration. In an event that the processor determines the bit fetched is '1', process 300 may proceed from 332 to 334, at which process 300 may involve the processor keeping the signal emitter on for 1 duration. The duration for the signal emitter to be off at sub-block 333 and on at sub-block 334 is determined by the predetermined modulation frequency of the communication protocol employed. Specifically, the length of the duration in time equals to the mathematical reciprocal of the modulation frequency. Process 300 may proceed from either 333 or 334 to 335.

At 335, process 300 may involve the processor determining whether the bit previously fetched at sub-block 331 is the last bit of the ASCII code, i.e., the least significant bit (LSB) thereof. In an event that the bit previously fetched at 331 is not yet the LSB of the 8-bit ASCII code representing the digit previously fetched, process may proceed from 335 to 336 to fetch the next bit of the ASCII code, and then proceed from 336 to 332. In an event that the bit previously fetched at 331 is already the LSB of the 8-bit ASCII code representing the digit previously fetched, process 300 may proceed from 335 to 340.

At 340, process 300 may involve the processor determining whether the digit previously fetched at sub-block 336 is the last digit of the 10-digit registration number "FA12345678". In an event that the digit previously fetched is not yet the last digit of the registration number, process 300 may proceed from 340 to 350 and fetch the next digit of the registration number. In an event that the digit previously fetched is already the last digit of the registration number, process 300 may proceed from 340 to 310 and repeat the modulation of signal emitter again.

In summary, process 300 may fetch a digit of the registration number and convert the digit to a binary representation, and modulate the signal emitter according to the binary representation one bit at a time, before moving to the next digit of the registration number. That is, process 300 may start by processing digit "F" of the registration number, and then digit "A", and then digit "1", and then digit "2", and then digit "3", . . . , and finally digit "8". Once every digit of the message (i.e., the registration number) is processed (i.e., fetched, converted, and the light emitter modulated accordingly), process 300 may repeat itself as long as UAV 010 is airborne or in operation.

Figure 4:
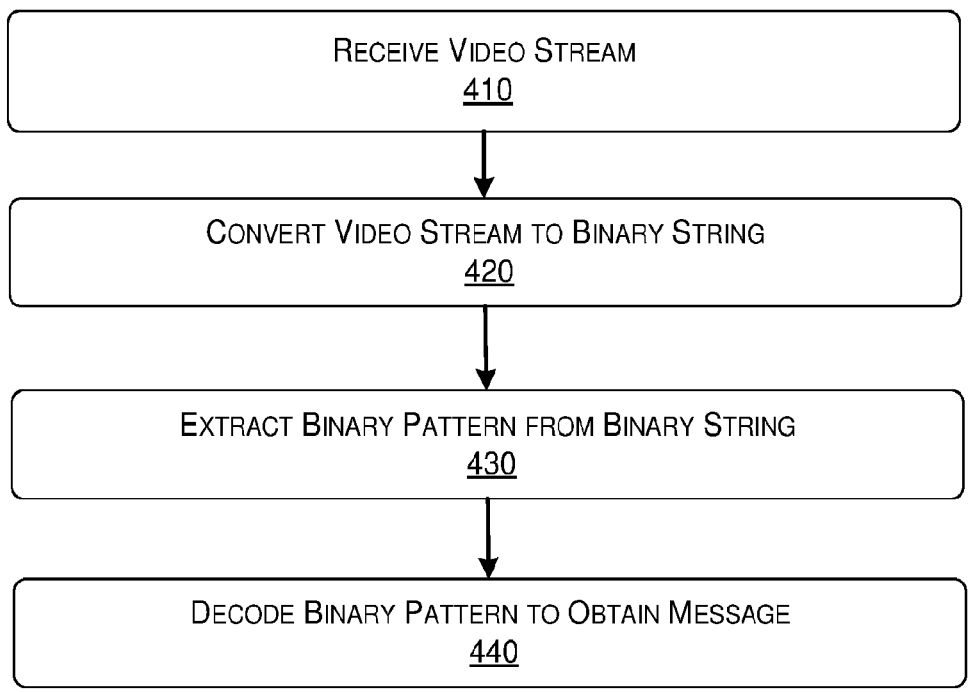
FIG. 4 is a flowchart depicting an example process of a receiving end of a communication system in accordance with an embodiment of the present disclosure.

FIG. 4 illustrates a flowchart depicting an example process 400 employed on the receiving end of the light communication system. In particular, process 400 shows how a processor on the receiving end of the light communication system (e.g., a processor embedded in smartphone 020 of FIG. 1) may decode the message conveyed in the modulated light signal sent from the transmitting end of the light communication system. Process 400 may include one or more operations, actions, or functions shown as blocks such as 410, 420, 430, 440 and 450 of FIG. 4. Although illustrated as discrete blocks, various blocks of process 400 may be divided into additional blocks, combined into fewer blocks, or eliminated, depending on the desired implementation. Process 400 may begin at block 410.

Figure 5:
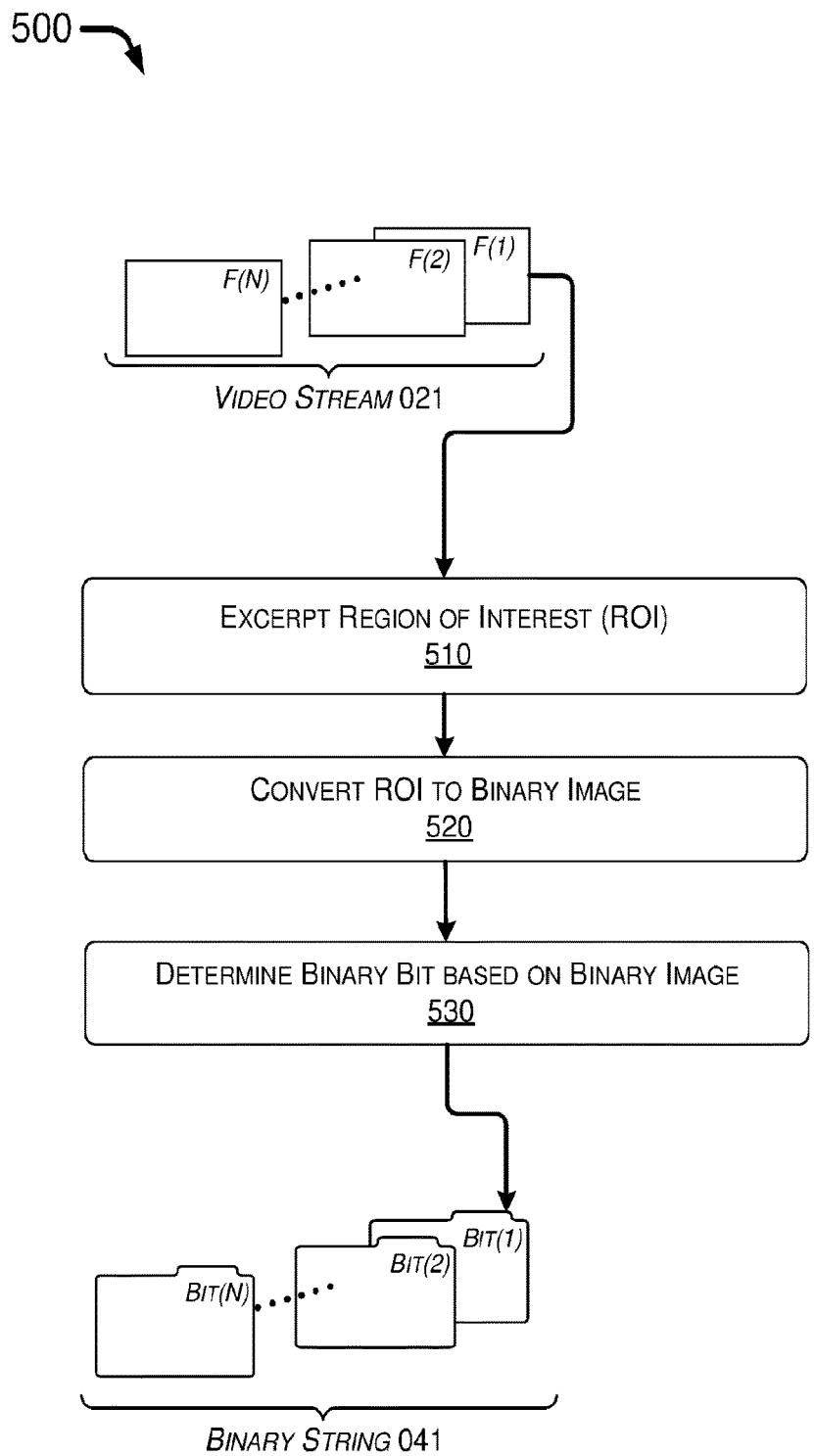
FIG. 5 is a flowchart depicting an example process of a part of the example process of FIG. 4 in accordance with an embodiment of the present disclosure.

At 410, process 400 may involve the processor embedded in smartphone 020 receiving a video stream, such as video stream 021 of FIG. 1. As mentioned above, video stream 021 may be generated by a video camera of smartphone 020. The video camera may track and record UAV 010 of FIG. 1 as UAV 010 traverses environment 099 of FIG. 1. As shown in FIG. 5, video stream 021 may consist of a plurality of video frames F(1), F(2), . . . , F(N) that are recorded or otherwise captured over a period of time by the video camera. Process 400 may proceed from 410 to 420.

At 420, process 400 may involve the processor converting video stream 021 to a binary string 041 as illustrated in FIG. 5. As shown in FIG. 5, binary string 041 may include a plurality of binary bits, Bit(1), Bit(2), . . . , Bit(N). Each of binary bits Bit(1)-Bit(N) has a value of either '0' or '1'. Furthermore, each of binary bits Bit(1)-Bit(N) has a one-on-one correspondence with one of video frames F(1)-F(N). For example, Bit(1) is derived from F(1) via blocks 510, 520 and 530, and so is Bit(2) derived from F(2), . . . , and Bit(N) from F(N). Moreover, binary string 041 may contain a binary pattern that repeats itself within binary string 041. The binary pattern may represent the message being conveyed in the light signal emitted by light emitter 017 of FIG. 1. In some embodiments, the message being conveyed may be the FAA registration number of UAV 010 of FIG. 1. The binary pattern may repeat itself within binary string 041 because the FAA registration number may be transmitted via light emitter 017 of UAV 010 over and over again according to process 300 of FIG. 3. More details regarding block 420 will be given at a later part of the present disclosure in paragraphs describing process 500 of FIG. 5 and process 700 of FIG. 7. Process 400 may proceed from 420 to 430.

At 430, process 400 may involve the processor extracting a binary pattern from binary string 041. The binary pattern may have a length predetermined by the communication protocol of the light communication system, and may consist of a string of 0 and 1 bits. The binary pattern may essentially represent the messaged being conveyed. In some embodiments, the binary pattern may be the message coded with ASCII coding.

For process 400 to successfully decode the binary pattern and eventually obtain the message conveyed in the light signal, it may be required that the binary pattern contains enough number of bits. Therefore, video stream 021 of FIG. 5 may need to have enough number of video frames F(1)-F(N). Assuming that the message is a 10-digit FAA registration number encoded according to ASCII table 200, the total number of bits in the binary pattern would need to be at least (10 digits per registration number)×(8 bits per digit)=80 bits. In addition, there may exist an oversampling relation between the modulation frequency of light emitter 017 and the frame rate of the camera recording UVA 010. For example, light emitter 017 may operate at a modulation frequency of 15 Hz, whereas the camera records at a 30-fps frame rate (i.e., the camera generates 30 frames per second). That may translate to a 2× oversampling rate, which means that video stream 021 may need to have at least 160 video frames for process 400 to generate a binary pattern of 80 bits long. Typical practice may require another 2× for redundancy and noise resistance, so practically the number N of FIG. 5 may be as large as 320 for process 400 to decode the FAA registration number of UAV 010.

More details regarding block 430 will be given at a later part of the present disclosure in paragraphs describing process 800 of FIG. 8. Process 400 may proceed from 430 to 440.

At 440, process 400 may involve the processor decoding the binary pattern to obtain the message. In some embodiments, the processor may use ASCII table 200 of FIG. 2 to decode the binary pattern into the message (e.g., FAA registration number of UAV 010).

Figure 7:
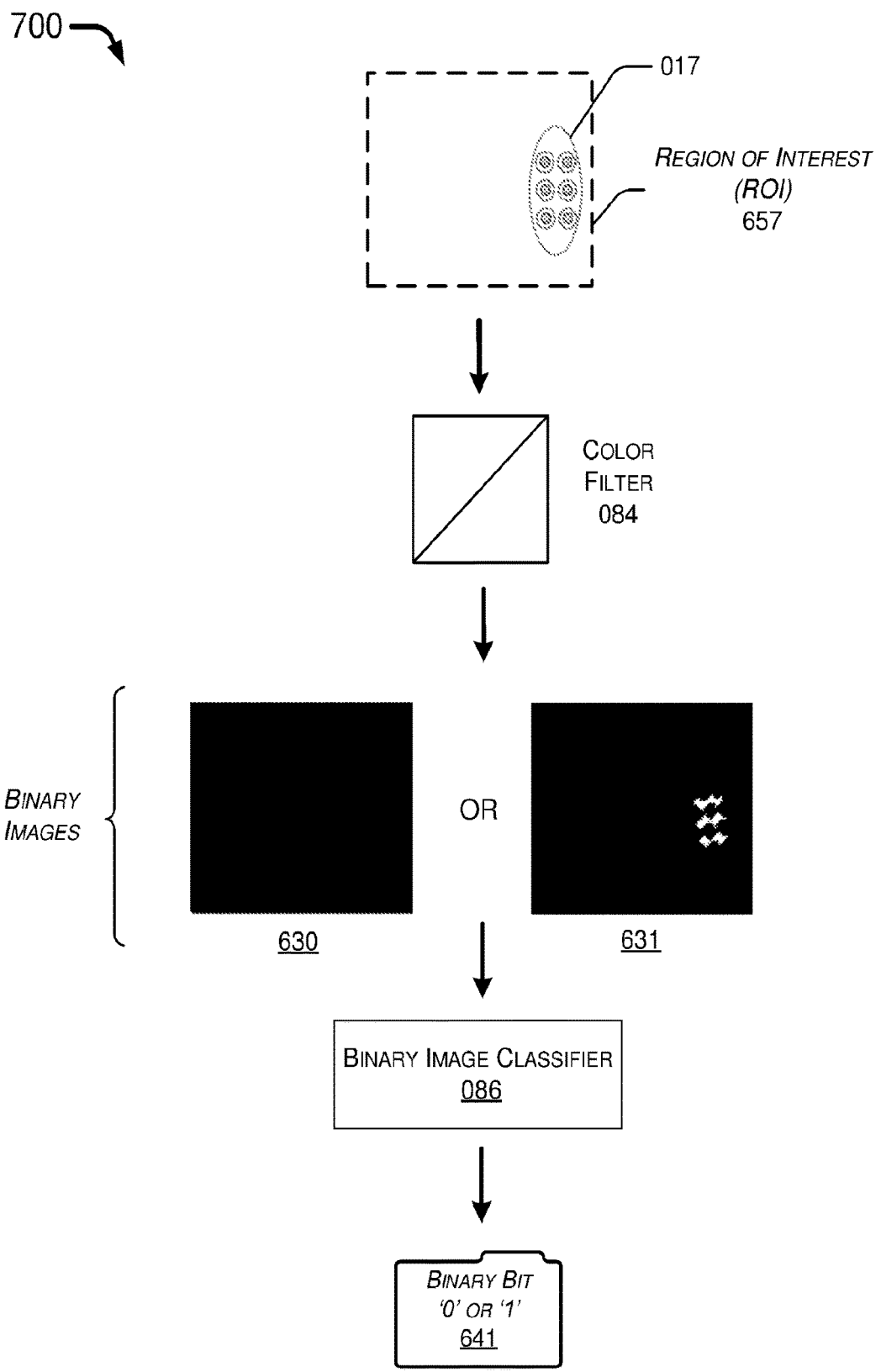
FIG. 7 is a flowchart showing details of another part of the example process of FIG. 5 in accordance with an embodiment of the present disclosure.

Referring to FIGS. 5-7, more details regarding block 420 of process 400 of FIG. 4 are given below.

FIG. 5 illustrates a flowchart depicting an example process 500 that may be an embodiment of block 420 of process 400 of FIG. 4. Process 500 may include one or more operations, actions, or functions shown as blocks such as 510, 520 and 530 of FIG. 5. Although illustrated as discrete blocks, various blocks of process 500 may be divided into additional blocks, combined into fewer blocks, or eliminated, depending on the desired implementation. Process 500 may begin at block 510.

At 510, process 500 may involve a processor on the receiving end of the light communication system (e.g., a processor embedded in smartphone 020 of FIG. 1) excerpting a respective region of interest (ROI) for each of video frames F(1)-F(N) of video stream 021. As mentioned above, video stream 021, generated or recorded by a camera on the receiving end of the light communication system, may record or otherwise capture UAV 010 traversing environment 099 over a period of time. That is, video frames F(1)-F(N) may be continuous in time, with each frame taken after a previous frame by a certain time interval. The time interval may be a characteristic of the camera. For example, if the camera records video stream 021 with a frame rate of 30 fps then the time interval is $\frac{1}{30}$ seconds. Furthermore, each of video frames F(1) F(N) may include UAV 010, in addition to some of other objects or background presenting in environment 099, such as house 091, tower 092, tree 093, hill 094, road 095 and/or airplane 096.

FIG. 6 illustrates the relationship between a video frame and a ROI of the video frame. Video frame 621 may represent any of video frames F(1)-F(N) of FIG. 5. As shown in FIG. 6, video frame 621 captures UAV 010 as well as light emitter 017 thereof. Additionally, other objects within environment 099, such as house 091, tower 092, tree 093 and road 095, are also captured in video frame 621. These other objects, however, does not provide useful information regarding the message conveyed in the light signal emitted from light emitter 017 of UAV 010, as the message is inherent in the light signal emitted from light emitter 017, but not in other objects captured in video frame 621. Therefore, at block 510 of process 500, the processor embedded in smartphone 020 may excerpt the ROI from video frame 621 (e.g., ROI 651 or ROI 657 of FIG. 6). ROI 651 may include mostly UAV 010, while ROI 657 may include not much more than simply light emitter 017 of UAV 010. ROI 651 and ROI 657 are "regions of interest" because the message is conveyed through the light signal emitted from light source 017 of UAV 010. The portion of video frame 621 outside ROI 651 (or even ROI 657) may be disregarded by blocks 520 and 530 of process 500 that follow block 510, as little information related to the message being conveyed lies therein. In short, the ROI allows tracking light emitter 017 in real time and masking non-essential parts of video stream 021. Furthermore, the use of ROI 651 or ROI 657 rather than the whole video frame 621 also provides the benefit of reducing image noise resulted by stray lights captured in video frame 621. For example, tower 092 may emit a strong anti-collision light in all directions, and some of the anti-collision light may be captured by smartphone 020 on video frame 621 as stray light. The noise caused by the stray light would be minimized as the following step of process 500, block 520, may be applicable to ROI 651 or ROI 657 rather than the whole video frame 621.

Also at 510, the processor on the receiving end may excerpt ROI 651 or ROI 657 using an object tracker 682, as shown in FIG. 6. That is, object tracker 682 may acquire knowledge of the position of UAV 010, or light emitter 017 thereof, in each of video frames F(1)-F(N) of FIG. 5. Object tracker 682 may be implemented using software, hardware, or a combination of both. For example, object tracker 682 may be implemented by a cascading neural network (CNN) circuit, or by one or more software classifiers. When more than one software classifiers are used, the classifiers are cascaded and the classification results of the classifiers are pooled to produce a stronger cascaded classifier. To serve as object tracker 682, the CNN circuit or the cascaded classifier may need to be pre-trained with various training video streams. The training process may involve generating low level visual textures from similar local clusters of pixels across the training video streams. Having been trained, the CNN circuit or the cascaded classifier may be able to recognize light emitter 017 in video frames F(1)-F(N) of video stream 021 and create or otherwise excerpt an ROI, for each of video frames F(1)-F(N), that contains light emitter 017 of UAV 010. Process 500 may proceed from 510 to 520.

At 520, process 500 may involve the processor on the receiving end of the light communication system converting the ROI of each of video frames F(1)-F(N), as excerpted in block 510, to a respective binary image, such as binary image 630 or 631 of FIG. 7. For example, as illustrated in FIG. 7, the processor may convert ROI 657 (i.e., the ROI of video frame 621 of FIG. 6) to either binary image 630 or 631 using one or more color filters 084. That is, depending on whether light emitter 017 is on or off as captured in ROI 657, the output of color filter(s) 084 may be either binary image 630 or binary image 631. As shown in FIG. 7, light emitter 017 as may include 6 LEDs arranged in a geometric arrangement of an array. In an event that light emitter 017 is off as captured in ROI 657, color filter(s) 084 may have binary image 630 as an output, which is pretty much a solid black or dark image. In an event that light emitter 017 is on as captured in ROI 657, color filter(s) 084 may have binary image 631 as an output, wherein a few brighter spots are shown in a dark background. As shown in FIG. 7, the location of the brighter spots may roughly correspond to a position of light emitter 017 with respect to ROI 657. In some embodiments, a hue saturation value space color filter may be used as color filter(s) 084. Process 500 may proceed from 520 to 530.

At 530, process 500 may involve the processor on the receiving end of the light communication system determining a value of a binary bit based on the binary image resulted in block 520. As shown in FIG. 7, process 500 may determine the value of binary bit 641 by using a binary image classifier 086. In an event that color filter 084 outputs binary image 630, binary image classifier 086 may determine that binary bit 641 has a value of '0'. In an event that color filter 084 outputs binary image 631, binary image classifier 086 may determine that binary bit 641 has a value of '1'. Similar to object tracker 082 of FIG. 6, binary image classifier 086 of FIG. 7 may also be implemented by either a hardware CNN or a software cascaded classifier, or a combination of both. Likewise, binary image classifier 086 may also need to be pre-trained using training data. Alternatively or additionally, binary image classifier 086 may determine the value of binary bit 641 by counting edge numbers of binary image 630 or 631 using a computer vision algorithm.

With process 500 of FIG. 5, each of binary bits Bit(1)-Bit(N) of binary string 041 of FIG. 5 may be respectively determined based on a corresponding one of video frames F(1) F(N) of video stream 021. That is, with process 500, the processor on the receiving end of the light communication system may determine a value of binary bits Bit(1) based on video frame F(1), a value of binary bits Bit(2) based on video frame F(2), . . . , and a value of binary bits Bit(N) based on video frame F(N).

Referring to FIG. 8, more details regarding block 430 of process 400 of FIG. 4 are given below.

FIG. 8 illustrates a flowchart depicting an example process 800 that may be an embodiment of block 430 of process 400 of FIG. 4. Process 800 may include one or more operations, actions, or functions shown as blocks such as 810, 820, 830, 832, 834, 840, 850, 860 and 870 of FIG. 8. Although illustrated as discrete blocks, various blocks of process 800 may be divided into additional blocks, combined into fewer blocks, or eliminated, depending on the desired implementation. Process 800 may begin at block 810.

At 810, process 800 may involve a processor on the receiving end of the light communication system (e.g., a processor embedded in smartphone 020 of FIG. 1) transforming the binary string (e.g., binary string 041 of FIG. 5) generated in block 420 of process 400 from a time-domain representation of the binary string to a frequency-domain representation of the binary string. An example binary string 041 may be:

"0011110000001100110000000000110000000111100
000011001100000000011
00000011110000001100110000000001100"  [t1]

Representation [t1] may be the time-domain representation of the binary string, which may equivalently be perceived as "2 bits of 0's followed by 4 bits of 1's followed by 6 bits of 0a's followed by 2 bits of 1's followed by 2 bits of 0's followed by 2 bits of 1's followed by 10 bits of 0's followed by 2 bits of 1's followed by 6 bits of 0's followed by 4 bits of 1's followed by 6 bits of 0's followed by 2 bits of 1's followed by 2 bits of 0's followed by 2 bits of 1's followed by 10 bits of 0's followed by 2 bits of 1's followed by 6 bits of 0's followed by 4 bits of 1's followed by 6 bits of 0's followed by 2 bits of 1 's followed by 2 bits of 0's followed by 2 bits of 1's followed by 10 bits of 0's followed by 2 bits of 1's followed by 2 bits of 0's". With this perception, representation [t1] may be transformed to frequency domain, and becomes:

"2,4,6,2,2,2,10,2,6,4,6,2,2,2,10,2,6,4,6,2,2,2,10,2,2"  [f1]

Namely, representation [f1] may be the frequency-domain representation of the binary string. Process 800 may proceed from 810 to 820.

At 820, process 800 may involve the processor determines peak locations in the frequency-domain representation of the binary string. In some embodiments, a location in the frequency-domain representation of the binary string may be determined as a peak location when the value at the location is at least three standard deviations away from the mean value of frequency-domain representation of the binary string. For example, for representation [f1], the processor may determine peak locations to be locations of 10 in representation [f1]. Process 800 may proceed from 820 to 830 to determine a frequency-domain representation of the binary pattern. Block 830 may include sub-blocks 832 and 834. Specifically, process 800 may proceed from 820 to 832.

At sub-block 832, process 800 may involve the processor dividing the frequency-domain representation of the binary string into a plurality of segments based on the peak locations. For example, the processor may divide representation [f1] into the following four segments:

"2,4,6,2,2,2"  [fs1]

"10,2,6,4,6,2,2,2"  [fs2]

"10,2,6,4,6,2,2,2"  [fs3]

"10,2,2"  [fs4]

Process 800 may proceed from 832 to 834.

At sub-block 834, process 800 may involve the processor determining one of the plurality of segments as the frequency-domain representation of the binary pattern. The processor may achieve this by using a vote algorithm. For example, the processor may apply a vote algorithm to segments [fs1], [fs2], [fs3] and [fs4] and determine segment [fs2] (which is identical to [fs3]) may be the frequency-domain representation of the binary pattern. That is, the vote algorithm may select the most common representation among segments [fs1]-[fs4] to be the frequency-domain representation of the binary pattern. In practical cases where binary string 041 may be susceptible to various noises present in environment 099, the plurality of segments may likely include segments such as:

"10,2,6,4,6,2,2,2"  [fs1']

"11,1,6,4,6,2,2,2"  [fs2']

"10,2,6,4,6,2,2,2"  [fs3']

"10,2,6,4,6,3,1,2"  [fs4']

"10,2,6,3,6,2,2,2"  [fs5']

"9,2,6,4,6,2,2,2"  [fs6']

Nevertheless, the vote algorithm would still determine "10, 2, 6, 4, 6, 2, 2, 2" to be the frequency-domain representation of the binary pattern among segments [fs1']-[fs6']. Process 800 may proceed from 834 to 840.

At block 840, process 800 may involve the processor generating a self-concatenated frequency-domain representation of the binary pattern by concatenating the frequency-domain representation of the binary pattern with a duplication of the frequency-domain representation of the binary pattern. Without generating the self-concatenated frequency-domain representation, the processor may not be able to locate the message identifier in block 870. To illustrate this point, consider the frequency-domain representation of the binary pattern, "10, 2, 6, 4, 6, 2, 2, 2", as determined at sub-block 834. Recall that the binary pattern starts at a peak location as located at block 820. The peak location is located purely statistically based on the frequency-domain representation of the binary string, and may or may not coincide with the message identifier of the message (e.g., letter "F" or letters "FA" of a FAA registration number). The self-concatenated frequency-domain representation would remove the chance of a mishap that a peak location happens to coincide with a part of the message identifier, and thus break the message identifier in two pieces. With the frequency-domain representation of the binary pattern being "10, 2, 6, 4, 6, 2, 2, 2", the processor may generate the self-concatenated frequency-domain representation of the binary pattern as:

"10,2,6,4,6,2,2,2,10,2,6,4,6,2,2,2"  [f2]

Process 800 may proceed from 840 to 850.

At block 850, process 800 may involve the processor transforming the self-concatenated frequency-domain representation of the binary pattern to a time-domain representation of the binary pattern. For example, the processor may transform the self-concatenated frequency-domain representation of the binary pattern, [f2], to time domain, as follows:

"00000000001100000011110000001100110000000
0011000000111100000011 001100"  [t2]

Representation [t2] may be the time-domain representation of the binary pattern. Process 800 may proceed from 850 to 860.

At block 860, process 800 may involve the processor removing redundancy in the time-domain representation of the binary pattern caused by oversampling of a camera generating the video stream. Namely, the processor may perform an anti-aliasing action to representation [t2]. As mentioned above, the light emitter 017 of UAV 010 of FIG. 1 may have a modulation frequency of 15 Hz, while the camera of smartphone 020 may have a video frame rate of 30 fps. This may translate to a 2× oversampling. In the event of the 2× oversampling, the processor may remove the redundancy due to the 2× oversampling by simply removing every other bit in representation [t2], resulting in:

"0000010001100010100001000110001010"  [t2']

Representation [t2'] may be the time-domain representation of the binary pattern after the redundancy due to the 2× oversampling has been removed. Process 800 may proceed from 860 to 870.

At block 870, process 800 may involve the processor determining the binary pattern by locating instances of a predetermined message identifier in the time-domain representation of the binary pattern. For example, the processor may locate the instances of the message identifier, letter "F", used in the communication protocol of FAA registration number for UAVs. Knowing that the ASCII code of letter "F" is '01000110', the processor may locate two instances of the message identifier, as follows (the instances of the message identifier are shown in bold font):

"000001000110001001000110001010"  [t2']

With the instances of the message identifier located, the processor may thus determine the binary pattern to be:

"01000110001010000"  [tp3]

Although various embodiments of single channel light communication that are described above and will be disclosed below are illustrated mainly using UAVs as an example, the application of the light communication system may extend beyond UAV registration and include other manned or unmanned transportation vehicles, such as a land-based vehicle, a waterborne vessel or an aerial vehicle. Furthermore, both the transmitting end and the receiving end of the light communication system may be implemented on a same vehicle. For example, in addition broadcasting its own FAA registration number, a UAV may also be capable of decoding light signals emitted from nearby UAVs to identify them. As another example, a land-based vehicle (e.g., a car) may be equipped with both transmitting and receiving components of the light communication system so that V2V (i.e., vehicle-to-vehicle) or V2X (i.e., vehicle-to-surrounding) communication may be achieved when the land-based vehicle traverses a non-networked area.

The wavelength of the light signal used in the light communication system as described above may extend beyond the scope of visible light. For example, light emitter 017 may include an infrared light source, and smartphone 020 or other devices on the receiving end may be equipped with an infrared camera and thus capable of receiving a modulated infrared signal emitted from the infrared light source.

Figure 9:
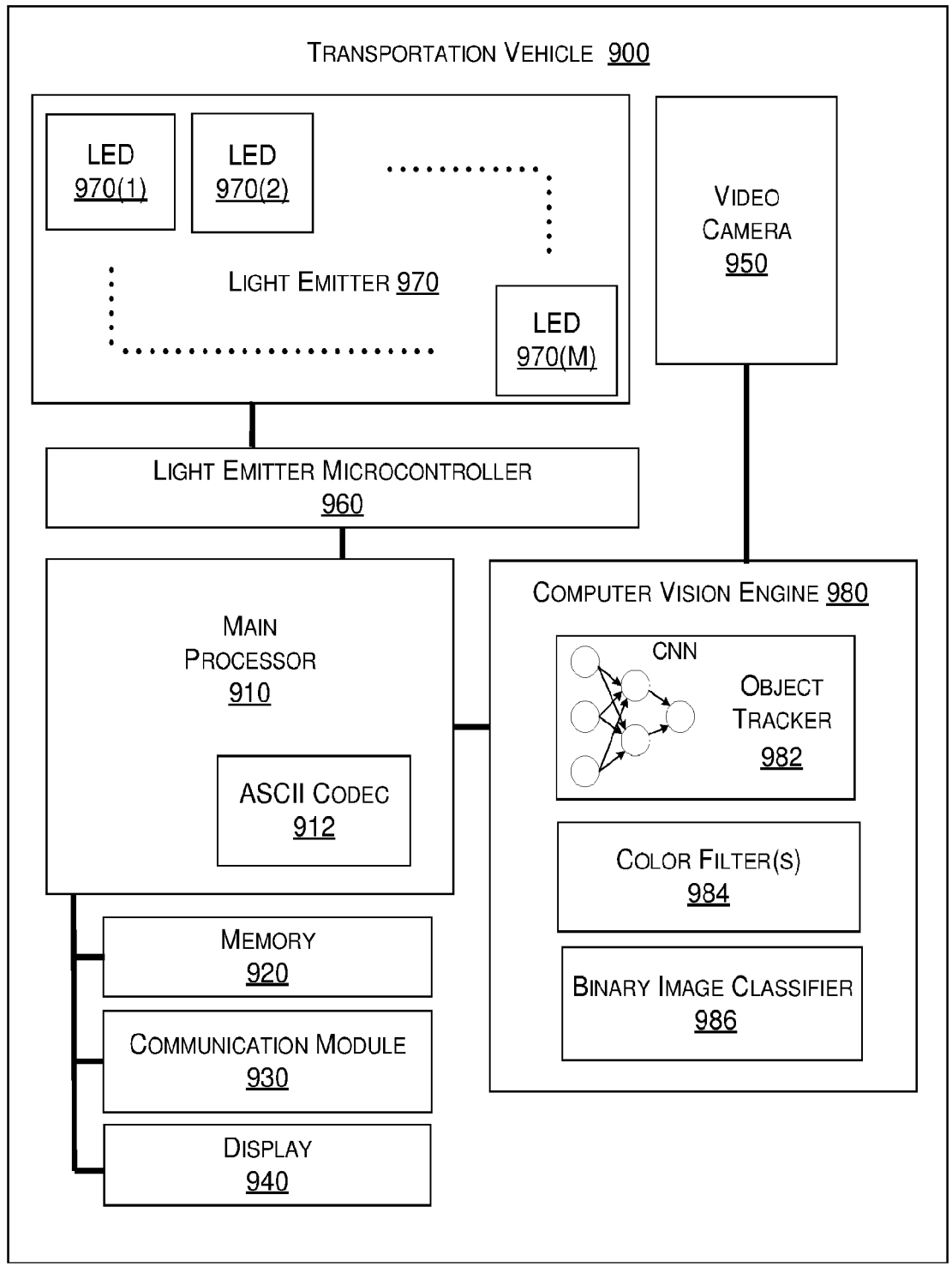
FIG. 9 is a block diagram depicting an example transportation vehicle in accordance with an embodiment of the present disclosure.

FIG. 9 illustrates an example block diagram of a transportation vehicle 900. Transportation vehicle 900 may include a computer or a main processor 910, such as a processor embedded in smartphone 020 of FIG. 1 capable of performing process 400 of FIG. 4. Transportation vehicle 900 may also include a video camera 950 capable of recording a mobile or stationary object (e.g., UAV 010 of FIG. 1) that may be sending out a modulated light signal from a light emitter of the object (e.g., light emitter 017 of UAV 010). The light signal may arrive at transportation vehicle 900 along a LOS between the object and transportation vehicle 900 (e.g., LOS 123 of FIG. 1 between UAV 010 and smartphone 020). Specifically, video camera 950 may be capable of generating a video stream (e.g., video stream 021 of FIG. 5) that records the object. The video stream may consist of a plurality of video frames (e.g., video frames F(1)-F(N) of FIG. 5) recorded continuously in time, and each of the video frames may have an image of the light emitter of the object (e.g., video frame 621 of FIG. 5 having an image of light emitter 017).

In addition, transportation vehicle 900 may include a computer vision engine 980 for analyzing and/or processing the video stream recorded by video camera 950. Specifically, main processor 910 may utilize computer vision engine 980 to perform process 500 of FIG. 5 and convert the video stream to a binary string (e.g., binary string 041 of FIG. 5). The binary string may consist of a plurality of binary bits (e.g., binary bits Bit(1)-Bit(N) of FIG. 5). The binary string may contain a repeated binary pattern that represents a message conveyed in the modulated light signal sent by the object.

In some embodiments, computer vision engine 980 may include an object tracker 982 (such as object tracker 682 of FIG. 6) that may be utilized by main processor 910 to excerpt a ROI (such as ROI 651 or ROI 657 of FIG. 6) from each of the plurality of video frames. In some embodiments, computer vision engine 980 may also include one or more color filters 984 (such as color filter 084 of FIG. 7) that may be utilized by main processor 910 to convert the ROI of each of the video frames to a binary image (such as binary image 630 or 631 of FIG. 7). In some embodiments, computer vision engine 980 may further include a binary image classifier 986 (such as binary image classifier 086 of FIG. 7) that may be utilized by main processor 910 to determine a value (either '0' or '1') of a corresponding one of binary bits based on the binary image.

Furthermore, main processor 910 may perform process 800 of FIG. 8 to extract the binary pattern (e.g., binary representation [tp3] as shown above) from the binary string.

In some embodiments, main processor 910 may include an ASCII codec 912 to decode the binary pattern and obtain the message. In some embodiments, transportation vehicle 900 may also include a memory 920 capable of storing various binary representations (e.g., [t1], [f1], [fs1]-[fs4], [fs1']-[fs6'], [t2], [t2'] and [tp3] as shown above) when main processor 910 performs process 800, and/or of storing the message as decoded by ASCII codec 912 from the binary pattern. In some embodiments, transportation vehicle 900 may also include a communication module 930 capable of communicating the message as decoded to a third party. For example, ASCII codec 912 may decode the binary pattern and result in a FAA registration number of a UAV performing unauthorized flying, and main processor 910 may be able to notify a law enforcement department about the FAA registration number via communication module 930. In some embodiments, transportation vehicle 900 may also include a display 940 capable of showing the message as decoded.

In some embodiments, transportation vehicle 900 may include a light emitter microcontroller 960 and a light emitter 970 (such as light emitter 017 of FIG. 1), and main processor 910 may utilize light emitter microcontroller 960 and light emitter 970 to perform process 300 of FIG. 3. That is, main processor 910 may modulate light emitter 970 through light emitter microcontroller 960 such that light emitter 970 may emit or otherwise broadcast a light signal conveying a vehicle registration number of transportation vehicle 900 itself. ASCII codec 912 may encode the vehicle registration number and modulate light emitter 970 accordingly. In some embodiments, processor 910 may modulate light emitter 970 through light emitter microcontroller 960 to emit a light signal conveying a message other than the vehicle registration number of transportation vehicle 900.

In some embodiments, light emitter 970 may have a plurality of LEDs such as LEDs 970(1), 970(2), . . . , 970(M), as shown in FIG. 9, that are controlled by main processor 910 through light emitter microcontroller 960. LEDs 970(1)-970(M) may form a geometric arrangement, such as an array. In some embodiments, LEDs 970(1)-970(M) may be controlled to turn on or off at the same time. In some embodiments, LEDs 970(1)-970(M) may be controlled only a part, but not all, of LEDs 970(1)-970(M) may turn on at the same time. That is, LEDs 970(1)-970(M) may be controlled to collectively emit the light signal in various geometric patterns. The various geometric patterns may help increasing the bandwidth or throughput of the light communication by adding an extra degree of freedom in emitting the light signal. In some embodiments, some or all of LEDs 970(1)-970(M) may be able to emit lights with different wavelengths and thus showing different colors. The different colors may also help increasing the bandwidth or throughput of the light communication by adding another extra degree of freedom in emitting the light signal.

In the above disclosure, reference has been made to the accompanying drawings, which form a part hereof, and in which is shown by way of illustration specific implementations in which the present disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

The invention claimed is:

1. A method, comprising:
    receiving a video stream comprising a plurality of video frames continuous in time;
    converting the video stream to a binary string comprising a plurality of binary bits each corresponding to a respective one of the plurality of video frames, the binary string containing a repeated binary pattern representing a message;
    extracting the binary pattern from the binary string, wherein the extracting of the binary pattern comprises:
        transforming the binary string from a time-domain representation of the binary string to a frequency-domain representation of the binary string;
        locating peak locations in the frequency-domain representation of the binary string;
        determining, based on the peak locations, a frequency-domain representation of the binary pattern;
        generating a self-concatenated frequency-domain representation of the binary pattern by concatenating the frequency-domain representation of the binary pattern with a duplication of the frequency-domain representation of the binary pattern;
        transforming the self-concatenated frequency-domain representation of the binary pattern to a time-domain representation of the binary pattern; and
        determining the binary pattern by locating instances of a predetermined message identifier in the time-domain representation of the binary pattern; and
    decoding the binary pattern to obtain the message.

2. The method of claim 1, wherein the video stream records a vehicle traversing an environment, the vehicle equipped with a light emitter emitting a signal relevant to the message, and wherein the converting of the video stream to the binary string comprises:
    excerpting, from each of the plurality of video frames, a region of interest (ROI) of the respective video frame, the ROI including the light emitter;
    converting, for each of the plurality of video frames, the respective ROI to a binary image using one or more color filters; and
    determining, for each of the plurality of video frames, a value of a corresponding one of the plurality of binary bits based on the respective binary image.

3. The method of claim 2, wherein the excerpting of the ROI of the respective video frame comprises passing the respective video frame through a pre-trained cascading neural network (CNN), and wherein the CNN is configured to be pre-trained with training data.

4. The method of claim 1, wherein the determining of the frequency-domain representation of the binary pattern comprises:
    dividing the frequency-domain representation of the binary string into a plurality of segments based on the peak locations; and
    determining, using a vote algorithm, one of the plurality of segments as the frequency-domain representation of the binary pattern.

5. The method of claim 1, wherein, after the transforming of the self-concatenated frequency-domain representation of the binary pattern to the time-domain representation of the binary pattern and before determining the binary pattern, the method further comprises:
    removing redundancy in the time-domain representation of the binary pattern caused by oversampling of a camera generating the video stream.

6. The method of claim 1, wherein the decoding of the binary pattern to obtain the message comprises decoding the binary pattern according to an American Standard Code for Information Interchange (ASCII) coding method.

7. The method of claim 1, wherein the video stream records a vehicle traversing an environment, and wherein the vehicle is equipped with one or more light emitters emitting a signal relevant to the message.

8. The method of claim 7, wherein the one or more light emitter comprises a plurality of light-emitting diodes (LEDs), and wherein the signal comprises a modulated light signal emitted from one or more of the plurality of LEDs, the modulated light signal presented in one or more colors, one or more geometrical patterns, or both, of the one or more of the plurality of LEDs.

9. The method of claim 7, wherein the vehicle comprises an unmanned aerial vehicle (UAV), a waterborne vessel, or a land-based vehicle, and wherein the message contains a registration number of the UAV, the waterborne vessel, or the land-based vehicle.

* * * * *